United States Patent Office 3,265,753
Patented August 9, 1966

3,265,753
NEW ALKYLTERPHENYLS AND METHOD OF MAKING SAME
Andre Goeb, Uriage, France, assignor to Societe d'Electro-Chimie d'Electro-Metallurgie et des Acieries Electriques d'Ugine, Paris, France, a corporation of France
No Drawing. Filed May 9, 1963, Ser. No. 279,339
Claims priority, application France, May 10, 1962, 897,164
21 Claims. (Cl. 260—671)

This invention relates to new organic compounds which are liquids at ordinary room temperature, which have a high boiling point, which are capable of industrial applications, particularly as heat-transfer liquids obtained by direct alkylation of terphenyls by means of ethylene.

The invention also relates to a method for the preparation of these products and their various applications, one of which is as a heat-transfer liquid.

These compounds are all the more interesting for the temperature range which includes ordinary room temperature and in which they remain in liquid state, is broad and they are stable and non-corrosive in this entire temperature range.

Numerous industrial products are used and are proposed as heat-transfer compounds, but all of them have disadvantages.

A mixture of diphenyl and diphenyl-oxide, the best known of which is sold as "Dowtherm" or "Gilotherm" has been proposed. If the usual mixtures give satisfaction regarding their stability, they boil at 225° C., and at higher temperatures and it is necessary to operate under pressure. On the other hand, their solidification point is 12° C. which creates difficulties in the use of same, when the temperature is low.

Other heat-transfer compounds have been recommended: chlorodiphenyls, squalane, organic derivatives of silicium, etc. These products are liquid at ordinary room temperatures, but their use is limited to temperatures which do not exceed 300–310° C.

The terphenyls which are stable at high temperatures, at least up to 400° C. have also been proposed but they have high melting points. Additionally, the mixture of isomers thereof, ortho, meta, para, the by-products of diphenyl manufacturing, are completely liquid only above 150° C.

It is known that it is often possible to lower the melting point of an aromatic hydrocarbon by fixing to same an alkyl group. Another consequence thereof is the rise of the boiling point. For instance, the diphenyl is liquid from 69° C. to 254° C. under normal pressure, but through alkylation it is possible to obtain a mixture of isomers of monoisopropyl diphenyl which is liquid from about −40° C. to about 294° C.

The literature points out a diethylterphenyl (Tsukervanik and Vikhrova, J. Gen. Chem. USSR 7, 632–6, 1937, cf. C.A. 31, 57,797), but it seems that this product melts only at 280° C. and is constituted only in small quantities during the Friedel-Crafts condensation of benzene and ethanol.

A recent French patent claims a composition which is liquid at ordinary room temperature, which has a boiling point higher than 180° C. under 0.4 mm. of mercury, and which is a mixture of mono-, di- and tri-ethylterphenyls with a predominance of diethyl compounds. This composition is obtained by alkylation of terphenyls at a temperature not exceeding 15° C. by means of an ethyl halogenide which is stable and liquid at this temperature, and, preferably, by the ethyl bromide used at a molecular ratio at least equal to 3:1 to the terphenyl. This ethyl bromide is employed in the presence of aluminum chloride in a quantity preferably equal to 3 to 4 moles per mole of terphenyl. These compositions are proposed as heat-transfer fluid; however, this method of manufacture is expensive for it uses a costly alkylation agent, and aluminum chloride in excess. Additionally, it is possible to meet with difficulties in elaborating the reactive medium, due to the great quantities of aluminum chloride employed.

One known method of alkylation of liquid aromatic hydrocarbons uses, preferably, an alkylation agent, an olefin in presence of catalysts such as $AlCl_3$ and other metallic chlorides, boron trifluoride, phosphoric acid and sulfuric acid. Industrially, ethylbenzenes are manufactured by alkylation of benzene in liquid phase, by injection of gaseous ethylene into the liquid in the presence of aluminum chloride. As a general rule, this is done at a temperature inferior to 100° C. so as to eliminate the risk of formation of tars.

Direct injection of ethylene into terphenyls in the liquid phase is not feasible, because the terphenyls are solid at temperatures under 100° C. It is possible to dissolve the terphenyl in a non-alkylable solvent to permit operation at these low temperatures; but another difficulty is met in that these terphenyls, and chiefly the paraterphenyl, are not readily soluble in these solvents. Thus, chloroform, which is one of the solvents recommended for the Friedel-Crafts reactions, and at the same time one of the best solvents known for the paraterphenyl, only dissolves 22.6 g. of same per liter at room temperature.

I have found that it is possible to obtain a good output of a new product without formation of substantial amounts of tar through the direct alkylation of the terphenyls when operating in melted medium and without a solvent. This new product has interesting industrial characteristics and properties.

The process according to my invention comprises maintaining at a temperature between 100° C. and 180° C., and preferably between 140° C. and 170° C., at least one terphenyl in the presence of a Friedel-Crafts catalyst, and injecting into same gaseous ethylene to alkylate the terphenyl. The alkylation reaction is carried out under agitation and under atmospheric pressure or pressures slightly superior thereto.

The invention uses any terphenyl, whatever is its composition, including a pure isomer or a mixture of at least two of these isomers. Probably because of an isomerization in the presence of Friedel-Crafts catalyst, use of any of the isomers is satisfactory. However, if the starting mixture has a melting point higher than the preferred temperature, it is possible, either to introduce same progressively into the reactive medium where it is dissolved or to submit same, during a certain time, to the action of the Friedel-Crafts catalyst is at a temperature superior to the preferred temperature.

One mixture of isomers which is particularly suitable is obtained as a heavy residue, during the industrial manufacture of diphenyl and whose composition is:

| | Percent |
|---|---|
| Paraterphenyl | 23 to 30 |
| Orthoterphenyl | 13 to 17 |
| Metaterphenyl | 57 to 62 |

This residue is preferably submitted to a previous distillation to separate the heavier products: quaterphenyls, etc.

The operative temperature is selected from the shown range, according to the composition of the mixture to be alkylated and/or the product desired.

It is possible to employ the catalysts generally used for alkylation of aromatic hydrocarbons, preferably the metallic chlorides such as $AlCl_3$, $ZrCl_4$, $FeCl_3$. These may be used in very small quantities and amounts of about 0.3 to 3% by weight relative to the product to be alkylated, are sufficient to secure a good alkylation speed and a good ethylene absorption.

The gaseous ethylene is the alkylation agent and it may be advantageously used with a promoter; for example, dry gaseous hydrochloric acid or gaseous ethyl chloride. This promoter is used in small quantity, about a few percent in volume relative to the ethylene, for instance 1 to 10%. The result of same is to increase the catalyst's activity.

The reaction may be executed continuously or discontinuously. In the case of discontinuous operation, the ethylene and the promoter are introduced into the charge of melted terphenyl and the operation is stopped as soon as the desired quantity has been absorbed. In the case of the continuous operation, I introduce continuously into the reactor, on one hand, the liquid terphenyl mixture, and, on the other hand, the ethylene and the promoter, in molecular proportions corresponding to the required degree of alkylation. The reacting volume is maintained constant and the alkylated mixture flows continuously.

In both cases, the catalyst is added in small quantities according to the ethylene absorption output. The alkylation reaction is exothermic so that it is necessary to furnish the reactor with a cooling apparatus, a tub or double jacket capable of eliminating any excess heat.

The ethylene absorption speed is high so long as the correct dispersion of the ethylene and of the catalyst is maintained. If these conditions are fulfilled, it is possible to reach absorption speeds such as 100 liters of gaseous ethylene per liter of reacting volume per hour.

The product coming out of the reactor is treated according to the usual and conventional techniques to eliminate the catalyst and any trace of acidity.

My new product is a mixture of ethylterphenyl which is liquid at ordinary room temperature, has a boiling point under atmospheric pressure superior to 400° C. and an average molecular weight between 290 and 350.

The rough alkylate obtained by my process is generally a complex mixture due to:

(1) The isomerism of the starting mixture of terphenyls and the possibility of a modification of the isomers' repartition in the reaction's conditions, and under the influence of the catalyst of alkylation;

(2) The complex repartition of the number of alkyl groups fixed on each molecule for a given middle degree of alkylation;

(3) The ring-isomerism of the alkyl groups.

The average rate of alkylation of this rough alkylate, i.e., the average number of ethyl groups fixed by each molecule of terphenyl, is preferably between 2 and 4.

This complete mixture does not allow an easy analytical resolution. This rough alkylate, or the different fractions issued of this mixture, is characterized by:

(a) The middle alkylation's degree, i.e., the average number of ethyl groups fixed by each molecule of terphenyl. This number is deducted from the average molecular weight;

(b) Some physical characteristic properties concerning the application looked for, particularly the boiling point, the distillation interval or the viscosity at different temperatures.

The alkylate may be liquid at ordinary ambient temperature if its alkylation rate is sufficient, and it may be thus used just as it is. But, I have found that I could let crystals of terphenyl, and of slightly alkylated terphenyl, be deposited. These constituents confer to the mixture of a vapor tension which is important at high temperatures.

It is thus better to fractionate by distillation so as to separate:

(1) A head-fraction which is solid at ordinary room temperature, which comprises a large proportion of terphenyls and ethylterphenyls of low alkylation degree, and which is responsible for the inconveniences described above;

(2) Generally an unimportant bottom-fraction which is a coagulate at low temperatures and contains strongly alkylated ethylterphenyls which produce in the mixture a noticeable increase in the viscosity at low temperature. If I stop at an average feeble degree of alkylation, the tail or bottom-fraction does not practically exist;

(3) A liquid fraction at ordinary temperature, which is the most interesting fraction and which is generally the heart-fraction.

It is possible to introduce again the head-fractions into the alkylation reactor and to make them go through a new alkylation to realize a high total output. This operation of recycling permits better regulation of the alkylation rate, i.e., the average number of ethyl groups fixed by each molecule of terphenyl, so as to obtain a good compromise between the different properties of the product and the requirements thereof.

The distillation interval of each fraction depends on the quality desired for the heart-fraction. For example, one interesting fraction is the one which, under a mercury residual pressure of 16 mm., passes off from 250° C. to 290° C.

The heart-fraction resulting from distillation of the rough alkylate is a clear oil with the following characteristics.

A boiling temperature higher than 400° C. under atmospheric pressure;
Liquid at ambient temperature;
Average molecule mass, 290–350;
Viscosity's scale:
    240–3000 centipoises at 34° C.
    10–50 centipoises at 80° C.
    1.6–2.5 centipoises at 189° C.

These products, which are liquid under atmospheric pressure, from room temperature to 400° C., may be used in numerous cases:

Firstly, they constitute excellent heat-transfer fluids which may be used in the liquid state and without pressure in excess of atmospheric. It is possible to distill them without decomposition under atmospheric pressure and long-lived experiments have shown that they can be used in continual work at temperatures as high as 350° C. without important changes in physical properties, viscosity, for example.

At higher temperatures, such as 400° C., their vapor tension remains inferior to the atmospheric pressure, but they experience a decomposition begining, which is, however, sufficiently small to make them able of being used at least during short times.

To point out this stability, an alkylterphenyl sample prepared according to the invention was liquid at ordinary room temperature, had an average molecular weight of 320, and a viscosity of 1.78 centipoises at 189° C. This sample was submitted to a long-length stability trial, in view of determining the use possibilities at high temperature.

Accordingly, 20 g. of the product was placed in a glass balloon of 50 ml., with a long neck. This balloon was purged with nitrogen and this nitrogen was maintained at normal pressure throughout the experiment.

The balloon was placed until half of the neck's height was in an enclosure maintained at 340° C. The product remained at this high temperature throughout the trial.

After 1000 hours, the viscosity at 189° C. was 1.81 centipoises, practically the same as the viscosity of the mixture before the trial.

Within the temperature range, the products prepared according to my invention have no corrosive action upon the usual metals, particularly the carbon and stainless steels. The selection of these products, as heat-transfer fluids, does not require any restriction concerning choice of material for the apparatuses.

Secondly, the ethylterphenyls, as the terphenyl itself, may be used as moderators-heat transfer fluids in atomic reactors and piles. Although their stability is inferior to the one of the terphenyl, they have, compared to the terphenyls, the advantage of being liquid at ordinary room temperatures.

Thirdly, the wide range of temperature in which they are liquid and their hydrocarbon nature allow also their utilization as solvents, and reactive mediums for high temperatures, and particularly for the separation of products by dissolution. The recovering of the dissolved product may be easily done, either by distillation or by cooling.

They may also, in certain cases, be used for the drawing off of the distillation's residues, for example, the vacuum distillation of fatty acids, at boiling temperatures inferior to 400° C., in a thin layer evaporator.

Fourthly, the products according to the invention may also be used as dielectric liquids.

The following non-limiting examples illustrate my invention and show that it can be carried out continuously as well as discontinuously.

Example 1

In a reactor of tubular form and provided with a good agitator and with apparatus for temperature regulation, and with a gas inlet in its lower part, I introduce 575 g. of a terphenyl already melted (a mixture of isomers resulting from the distillation of diphenyl residues). Through a lock chamber located at the upper part of the reactor is delivered an initial charge of aluminum chloride.

Then into the reactor is introduced 85 l./h. of ethylene and 0.8 liter/hour of gaseous ethyl chloride. The ethylene absorption was about equal to 80%. As soon as the ethylene absorption had a tendency to diminish, a new quantity of aluminum chloride was added through the lock chamber. The temperature was maintained between 155° C. and 165° C. through the run.

The volume of the reactive medium was regularly increased and the ethylene current was stopped when the average alkylation degree of 2.8 was reached. 10 g. of aluminum chloride was consumed, i.e., about 1.7% in weight, compared to the original terphenyl.

The resulting mixture was treated with acidulate water to eliminate the aluminum chloride, then washed and dried. 750 g. of rough alkylate was obtained from which was separated by vacuum distillation the following fractions:

| Fraction No. | Percent in weight | Aspect at ordinary temperature |
|---|---|---|
| I. 180-254/16 mm. Hg | 58 | Solid. |
| II. 254-261/16 mm. Hg | 11 | Liquid. |
| III. 261-280/16 mm. Hg | 26 | Liquid. |
| IV. 280-300/16 mm. Hg | 4 | Cold coagulate. |
| Residue: 6 g. | | |

The distillation residue is thus feeble, about 1%. In spite of the high temperature of the alkylation, the degradation by tars formation is very small.

The fraction II, of average molecular weight of 310, had a viscosity of 315 centipoises at 34° C. The fraction III, of average molecular weight of 330, had a viscosity of 900 centipoises at 34° C.

Example 2

A reactor of tubular form, equipped with a double cover and provided at its superior part with an overflow of alkylterphenyls of average molecular weight 255 is used and the temperature is maintained at 150° C.

The mixture of isomers of terphenyls heated to 150° C. was introduced continuously in an amount of 115 grams/hour, into the lower part of the reactor. A gaseous ethylene containing 10% by volume of ethyl chloride was delivered continuously into the reactor through a dispersing apparatus disposed at the bottom of the reactor.

Ethylene absorption was on an average 0.6 mole per hour. As in the previous example, the aluminum chloride was added by small successive charges.

The reacting mixture which flowed continuously from the overflow, was then washed and dried. 770 g. of alkylate was obtained after 6 hours. The aluminum chloride consumption was 20 g. for this same period.

The rough alkylate fractions are as follows:

| Fraction | Weight, g. | Aspect at ordinary temperature |
|---|---|---|
| I. 170-239/16 mm | 506 | Solid. |
| II. 240-256/16 mm | 160 | Pasty. |
| III. 256-290/16 mm | 92 | Liquid. |
| Residue and losses: 8 g. | | |

The last fraction III only was liquid and its average molecular weight was 325. The fraction II had an insufficient alkylation degree (average molecular weight 280) and crystallized in great part.

This example shows that it is possible to conduct the alkylation continuously and that the alkylation carried out with a small average degree of alkylation leads to a small output in liquid product. In this way, with an average rate of alkylation of 1.3, the liquid product at ordinary temperature represents only 11.8% of the rough alkylate; whereas, in the previous example, the alkylation rate of 2.8 leads to liquid fractions representing 37% of the rough alkylate.

Example 3

In an agitated Grignard, of 70 liters capacity, equipped with a double cover and a gas disperser, a charge of 41.4 kg. of terphenyl was submitted to alkylation by ethylene during 6 hours, in presence of ethyl chloride (2% in volume with regard to ethylene) and continued until an average alkylation degree of 3 was achieved. The catalyst was added by charges, every half an hour. In all, 0.850 kg. of aluminum chloride was used, i.e., 2% with regard to the terphenyl engaged.

The rough alkylate was washed, dried, them vacuum-distilled and the output of the distilled product was 95%.

The heart-fraction passing from 260°/13 mm. to 300°/9 mm., liquid at ordinary room temperature, represented 42% of the rough alkylate. Its average molecular weight was 335 and its viscosity at 34° C. was 1,550 centipoises. The bottom-fraction represented 5.2%.

In a second series of operations, 23 kg. of an isomeric mixture issued from the distillation of the residue of diphenyl manufacturing, and 21 kg of solid alkylterphenyls selected from the head-fractions resulting from the previous operation were placed in the reactor. The alkylation was again conducted until an average final alkylation rate of 3 was realized.

The aluminum chloride consumption has been 0.700 kg.

The fractional distillation of the alkylate, free from the aluminum chloride, had an output of 96% of the distilled product.

Near the head-fraction, solid at ordinary ambient temperature, a heart-fraction passing from 263°/13 mm. up to 300°/9 mm., representing 45.4% of the engaged rough alkylate was collected. Its average molecular weight was 325 and its viscosity at 34° C. amounted to 1,545 centipoises.

The fraction which was too strongly alkylated was equal to 5% of the rough alkylate.

I claim:

1. A new product comprising a mixture of ethylterphenyls which is liquid at ambient temperature and substantially at atmospheric pressure, which has a boiling point over 400° C. substantially at atmospheric pressure and which has an average molecular weight between 290 and 350.

2. The product of claim 1 characterized by said mixture having an average number of between 2 and 4 ethyl groups fixed by each molecule of terphenyl.

3. The product of claim 1 characterized by said mixture having a viscosity of
240–3,000 centipoises at 34° C.
10–50 centipoises at 80° C.
1.6–2.5 centipoises at 189° C.

4. The product of claim 1 characterized by said mixture having an average number of between 2 and 4 ethyl groups fixed by each molecule of terphenyl, and by said mixture having a viscosity of
240–3,000 centipoises at 34° C.
10–50 centipoises at 80° C.
1.6–2.5 centipoises at 189° C.

5. A method of making ethylterphenyls comprising alkylating at least one terphenyl in the molten state in the presence of a Friedel-Crafts catalyst by treating same with gaseous ethylene to form a reaction medium, carrying out said alkylation at a temperature between 100° C. and 180° C. and in absence of a solvent, said alkylating forming a crude alkylate, and separating said ethylterphenyls from said crude alkylate.

6. A continuous method of making ethylterphenyls comprising alkylating at least one terphenyl in the molten state in the presence of a Friedel-Crafts catalyst by treating same with gaseous ethylene to form a reaction medium, carrying out said alkylation at a temperature between 100° C. and 180° C., said alkylating forming a crude alkylate and fixing from 2 to 4 ethyl groups upon each terphenyl molecule, said crude alkylate, comprising a head fraction which is solid at ambient temperature, a bottom fraction which is a coagulate at ambient temperature and a heart fraction which is liquid at ambient temperature, separating said head fraction and said heart fraction from said crude alkylate and from one another by fractional distillation, recycling said head fraction and making additions of said terphenyl and of said gaseous ethylene to said medium.

7. A method of making ethylterphenyls which are liquid at ambient temperatures, which have a boiling point of over 400° C. at substantially atmospheric pressure and which have an average molecular weight between 290 and 350, comprising alkylating at least one terphenyl in the molten state in the presence of a Friedel-Crafts catalyst by treating same with gaseous ethylene to form a reaction medium, carrying out said alkylation at a temperature between 100° C. and 180° C., said alkylating forming a crude alkylate and fixing from 2 to 4 ethyl groups upon each terphenyl molecule, and separating said ethylterphenyls from said crude alkylate.

8. The method of claim 7 characterized by said terphenyl being a mixture of at least two isomers.

9. The method of claim 7 characterized by said catalyst being a metallic chloride.

10. The method of claim 7 characterized by said catalyst being selected from the group consisting of aluminum chloride, zirconium chloride and ferric chloride.

11. The method of claim 7 characterized by said catalyst being in an amount of about 0.3 to 3% by weight of said terphenyl.

12. The method of claim 7 characterized by carrying out said alkylation at a temperature between 140° C. and 170° C.

13. The method of claim 7 characterized by said gaseous ethylene being used with a promoter in an amount of 1 to 10% by volume of said ethylene.

14. The method of claim 13 characterized by said promoter being selected from the group consisting of gaseous hydrochloric acid and gaseous ethyl chloride.

15. The method of claim 5 wherein said catalyst is in an amount of about 0.3 to 3% by weight of said terphenyl.

16. The method of claim 5 wherein said gaseous ethylene is used with a promoter which is an amount of about 1–10% by volume of said ethylene.

17. The method of claim 5 wherein said alkylating is carried out at substantially atmospheric pressure and said medium is agitated during alkylation.

18. The method of claim 6 wherein said catalyst is in an amount of about 0.3 to 3% by weight of said terphenyl.

19. The method of claim 6 wherein said gaseous ethylene is used with a promoter which is in an amount of 1–10% by volume of said ethylene.

20. The method of claim 6 wherein said alkylating is carried out at substantially atmospheric pressure and said medium is agitated during alkylation.

21. The method of claim 7 wherein said alkylating is carried out at substantially atmospheric pressure and said medium is agitated during alkylation.

References Cited by the Examiner

UNITED STATES PATENTS

| 2,172,391 | 9/1939 | Krase | 260—671 |
| 2,324,784 | 7/1943 | Lieber | 260—671 |
| 2,939,890 | 6/1960 | Hervert et al. | 260—671 |
| 3,183,165 | 5/1965 | Gutzke | 176—92 |

FOREIGN PATENTS

| 1,234,835 | 5/1960 | France. | |

DELBERT E. GANTZ, *Primary Examiner.*

C. R. DAVIS, *Assistant Examiner.*